F. V. BROOKS.
AUTOMATIC COFFEE POT.
APPLICATION FILED DEC. 9, 1910.

1,002,819.

Patented Sept. 12, 1911.
3 SHEETS—SHEET 2.

F. V. BROOKS.
AUTOMATIC COFFEE POT.
APPLICATION FILED DEC. 9, 1910.
1,002,819.
Patented Sept. 12, 1911.
3 SHEETS—SHEET 3.
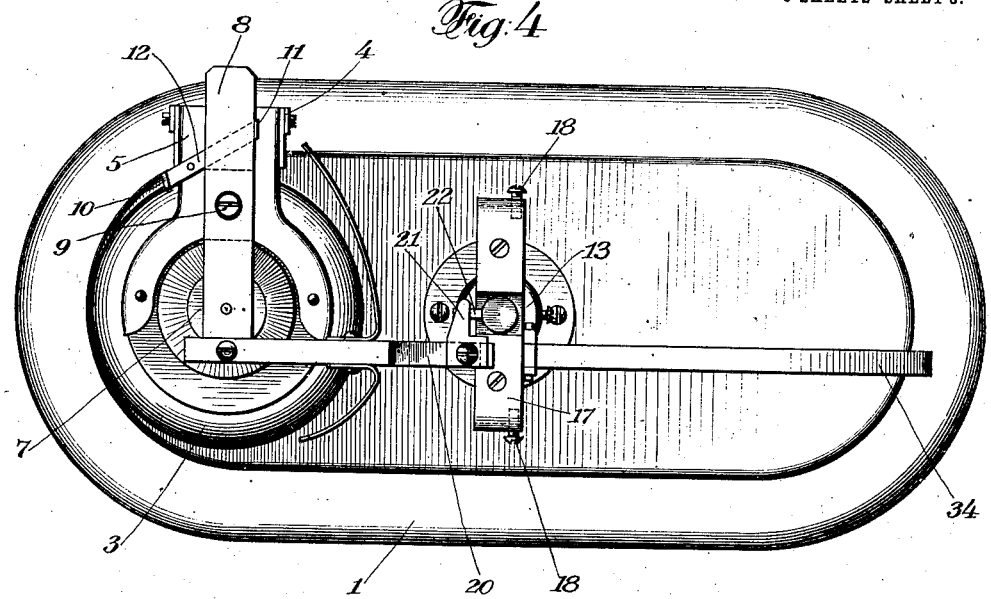
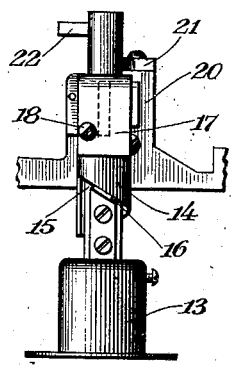
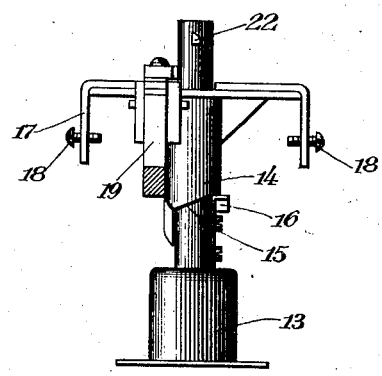
Witnesses:
Minerva Lobel
G. B. Prindle
Inventor
Franklin V. Brooks,
By his Attorneys
Prindle and Wright.

UNITED STATES PATENT OFFICE.

FRANKLIN V. BROOKS, OF NEW YORK, N. Y.

AUTOMATIC COFFEE-POT.

1,002,819. Specification of Letters Patent. Patented Sept. 12, 1911.

Application filed December 9, 1910. Serial No. 596,401.

*To all whom it may concern:*

Be it known that I, FRANKLIN V. BROOKS, of New York, in the county of New York and in the State of New York, have invented a certain new and useful Improvement in Automatic Coffee-Pots, and do hereby declare that the following is a full, clear, and exact description thereof.

The object of my invention has been to provide a coffee pot, which shall be so constructed that it shall be capable of automatically transferring water from a boiler to a filter in the coffee pot, and of automatically removing said boiler from over the lamp, and placing said coffee pot over said lamp; and to such ends my invention consists in the automatic coffee pot hereinafter specified.

In the accompanying drawings I have illustrated one embodiment of my invention, but such embodiment is to be regarded as typical only of many possible embodiments.

Figure 1:
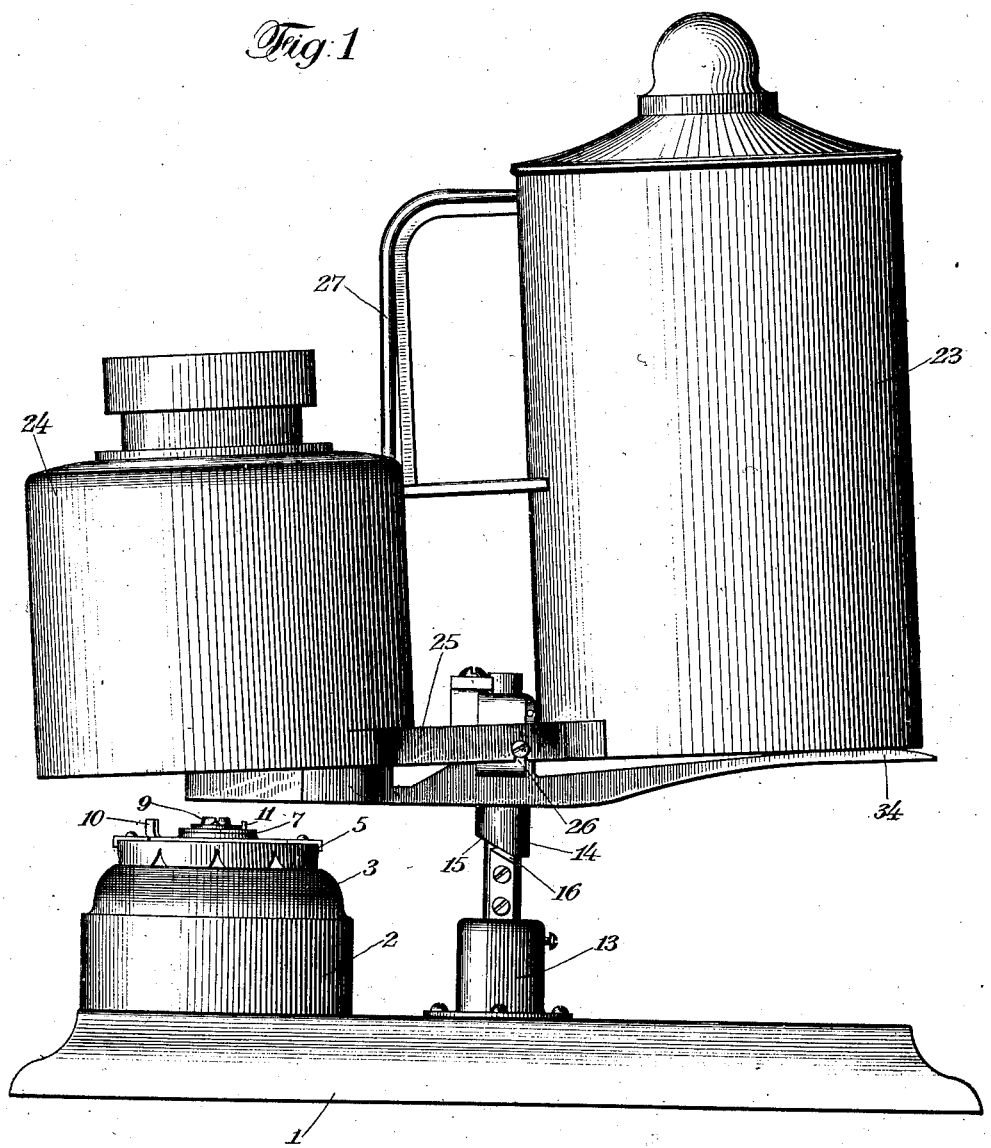
Figure 2:
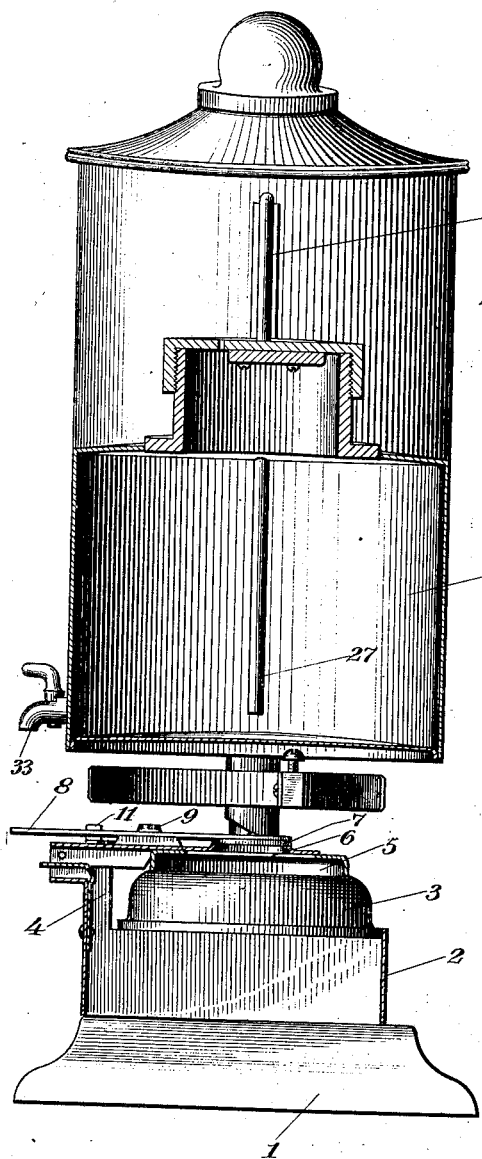
Figure 3:
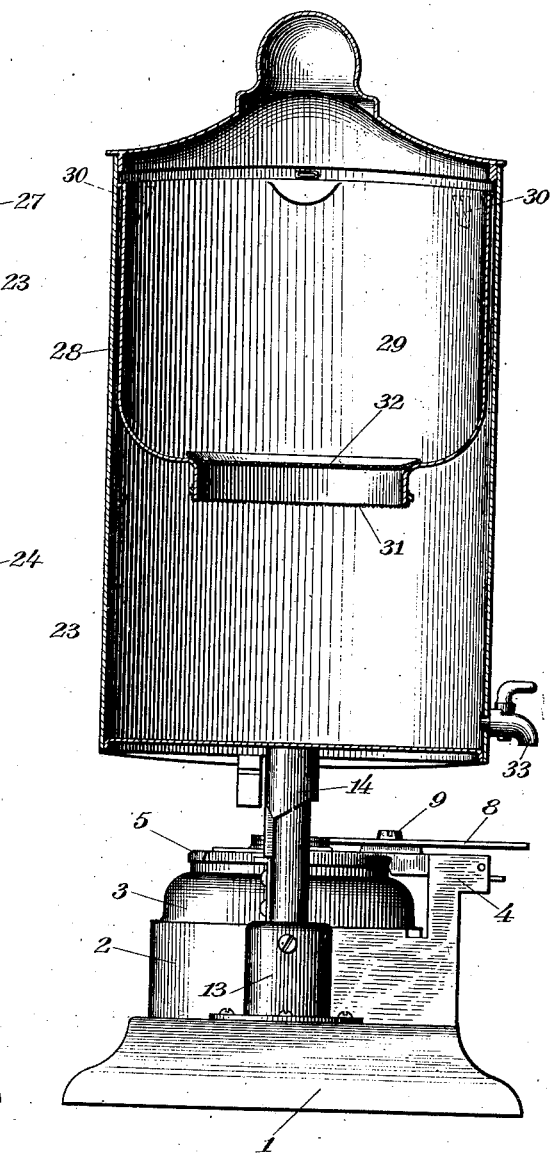

Figure 1 is a side elevation of one embodiment of my invention; Fig. 2 is a vertical sectional view through the boiler and lamp support; Fig. 3 is an end elevation showing the coffee pot in section; Fig. 4 is a top plan view the coffee pot and boiler being removed; and Figs. 5 and 6 are respectively a side elevation and a front elevation of the supporting post and sleeve and the parts immediately carried thereby.

In such embodiment I have provided a base 1, having thereon a lamp-support 2, in which rests a lamp 3, such, for instance, as an alcohol lamp. The support 2 carries a bracket 4, upon which is hinged a cover 5, that is adapted to fit over the lamp. The said cover is provided with an opening 6, through which the flame may rise. A valve is provided for exposing or closing the said opening, and such valve, as illustrated, consists of a disk 7 of suitable size for covering the said opening, said disk being mounted on the end of a lever 8, that is fulcrumed as upon a screw 9 on the said cover arm. I also preferably provide stops 10 and 11, formed by the bent-up ends of a strip 12 that is secured in the said cover arms, which stops limit the extreme movements of the said lever. A post 13 is mounted upon the said base and a sleeve 14 upon the said post. The lower edge 15 of said sleeve is formed into a spiral or screw, which is adapted to rest upon a stop 16 fastened upon the said post, and preferably having an upper surface inclined to correspond with the incline of the said screw, in such a manner that as the sleeve descends upon the post, as later described, its inclined surface acting upon the said stop, tends to turn the sleeve and the parts carried thereon. The said sleeve is provided with a bracket 17, or other form of support, which, in the present instance, carries screws 18, upon which the coffee-pot proper is mounted, as hereinafter described. The said bracket also has ears, between which is fulcrumed a lever 19. The said lever has a vertical arm 20, upon which is mounted a hook 21, that is adapted to engage a pin 22, mounted in or upon the vertical post. The hook and pin are correspondingly beveled, so that as the hook approaches the pin, in the rotation of the sleeve upon the post, its beveled face shall ride over the beveled face of the pin, and its vertical face engage the vertical face on the far side of the pin. Upon the said screws is mounted a combined coffee-pot and boiler, consisting of a coffee-pot 23 and a boiler 24, connected as by bars 25, the said bars having notches 26 that are adapted to fit over the said screws, so as to support and fulcrum the said combined structure on said screws. The coffee-pot and boiler are also connected preferably at other points by braces, so that they are rigidly fastened together. The boiler consists of a can that may be closed substantially steam-tight by a cover, the latter being preferably screwed on to the can. A pipe 27 extends into the said can and nearly to the bottom thereof, and enters the can 28 of the coffee-pot near the top thereof. A small vent is preferably provided in the boiler cover, so as to permit the escape of air until steam is formed.

Within the coffee-pot are provided any devices which will serve to make coffee, but preferably some form of filter that will hold the coffee well above the bottom of the coffee-pot, so that water may be filtered through the coffee and pass entirely below the same. The said filter in the present instance consists of a cup 29, having a flange that is adapted to rest upon lugs 30, formed in the coffee-pot body. A sieve 31 closes the lower end of the cup, and there is preferably also a plate 32, which has perforations small enough to prevent most of the coffee grounds from passing therethrough.

In the lower end of the coffee-pot is a spigot 33, from which the made coffee can be drawn.

The rear end of the lever is adapted to support the boiler, and the front end of the lever is adapted to support the coffee-pot, and for convenience of such support, I have provided a curved strip 34 in the rear end of the lever, which engages the bottom of the boiler, and inside of a flange formed thereon.

In the operation of my coffee-pot, the combined coffee-pot and boiler are turned until the boiler is over the lamp, in which position the hook will have engaged its stud, and the sleeve be thus locked in its highest position. The water in the boiler also will keep the rear end of the lever tipped down, and thus keep the hook in engagement with the stud. The lamp being lighted and regulated, will heat the boiler and gradually form steam therein. The steam pressing on the upper surface of the water, will force water through the pipe and over into the cup within the coffee-pot. There the water will filter through the coffee within the said cup, and pass to the bottom of the coffee-pot ready to use as coffee. When all the water in the boiler has been forced over into the coffee-pot by the action of the steam, the center of gravity of the combined coffee-pot and boiler will have changed from the rear side of the lever to the forward side thereof, and the coffee-pot will tip down, raising the boiler and raising the rear end of the lever, and disengaging the hook from its pin. The weight of the parts will then cause the screw surface on the sleeve to slide down on the beveled lug upon which it rests, thus turning the sleeve until the boiler has been removed from over the lamp, and the coffee-pot has been swung over the lamp. In this position the made coffee is kept heated by the lamp.

It will be observed that the action of my coffee-pot is automatic, and that it is not necessary to watch it to see when the coffee is completed, and to prevent burning the boiler by the continued application of heat after it is empty, nor to take any trouble to see that the coffee is kept hot.

It is obvious that various changes can be made in the above illustrated construction which will embody the spirit of my invention, and I desire not to be limited beyond the intendment of my claims, or the necessary requirements of the prior art.

I claim:—

1. A coffee-pot, comprising a coffee-making device, consisting of a coffee-pot and a boiler, a connection therebetween for transferring water, a lamp, and means for automatically removing said boiler from said lamp, and applying said lamp to said coffee-pot when the water from the boiler has been transferred to the coffee-pot.

2. In a coffee-making device, the combination of a coffee-pot and boiler, a pipe extending from a low level in the boiler to a high level in the coffee-pot, a filter in said coffee-pot above the bottom thereof, a lamp, and means for holding said boiler over said lamp until the water has been transferred to the coffee-pot, and for then removing said boiler from said lamp and bringing said coffee-pot and lamp together.

3. In a coffee-making device, the combination of a coffee-pot and boiler, means for transferring water from said boiler to a high level in said coffee-pot, a filter through which said water is adapted to pass, said filter being above the bottom of the coffee-pot, a lamp, a pivot upon which said coffee-pot and boiler are supported, so that one of them is over said lamp, means for holding said boiler over said lamp until the water therein has been transferred to said coffee-pot and means for automatically swinging said boiler out of the way and swinging said coffee-pot over said lamp.

4. In a coffee-making device the combination of a coffee-pot and boiler, means for transferring water from said boiler to a high level in said coffee-pot, a filter through which said water is adapted to pass, said filter being above the bottom of the coffee-pot, a lamp, a pivot upon which said coffee-pot and boiler are supported, so that one of them is over said lamp, means for holding said boiler over said lamp until the water therein has been transferred to said coffee-pot, and means for automatically swinging said boiler out of the way and swinging said coffee-pot over said lamp, said means being so constructed that it shall be operated by the weight of said water.

5. In a coffee-making device, the combination of a base having a vertical post thereon, a sleeve mounted on said post, a coffee-pot and boiler connected together and pivoted on said sleeve, means for automatically transferring water from said boiler to said coffee-pot, a lamp, and means whereby said boiler may be held over said lamp while containing water, and whereby, when said water is transferred to said coffee-pot, the boiler shall be swung out of the way and the coffee-pot transferred over the lamp.

6. In a coffee-making device, the combination of a base having a vertical post, a sleeve mounted on said post and having a spiral surface, a lug on said post which is adapted to support said spiral surface, a coffee-pot and boiler connected together and fulcrumed upon said sleeve at a point between said coffee-pot and boiler, a lamp, a catch to prevent rotation of said sleeve, said catch being mounted on a lever, said lever having arms adapted to be engaged by said coffee-pot and boiler, said parts being so constructed that when said sleeve is in its highest position said catch shall engage a pin on said post and shall be held in engagement therewith by the water in said boiler pressing said boiler against said lever, and when said boiler shall have been transferred to said coffee-pot, the change of weight shall depress said coffee-pot, causing the latter to swing said lever and disengage said catch from said stop, and thus permit rotation of said sleeve and the swinging of the boiler from over the lamp and the coffee-pot into the position of the boiler.

7. In a coffee-making device, the combination of a base having a lamp thereon and having a vertical stud, a sleeve mounted on said stud having a spiral surface, a lug on said stud adapted to engage said surface, a coffee-pot and boiler connected together and fulcrumed at a point between them on said sleeve, a lever on said sleeve having arms adapted to engage said coffee-pot and boiler, a catch on said lever and a pin on said stud adapted to be engaged by said catch, and a connection for conveying water from said boiler to said coffee-pot.

In testimony that I claim the foregoing I have hereunto set my hand.

FRANKLIN V. BROOKS.

Witnesses:
 EDWIN J. PRINDLE,
 MINERVA LOBEL.